UNITED STATES PATENT OFFICE.

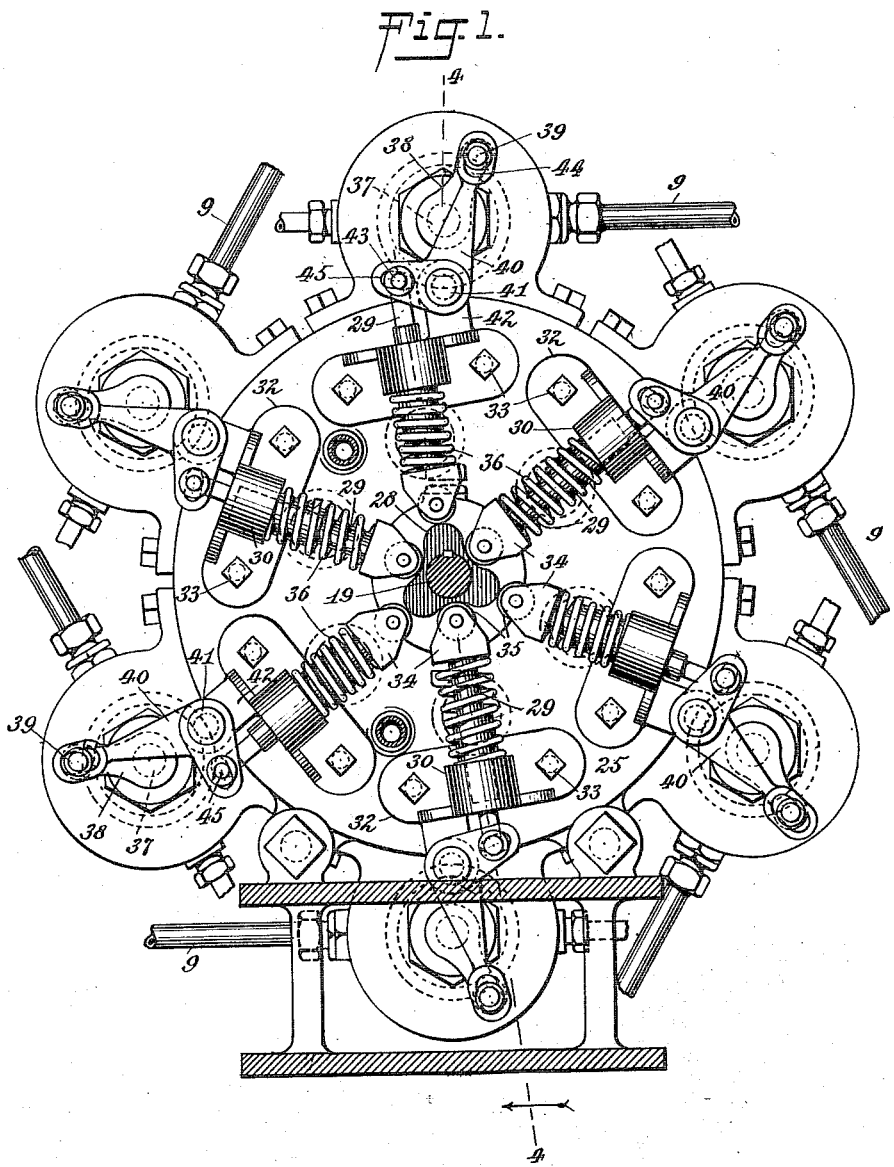

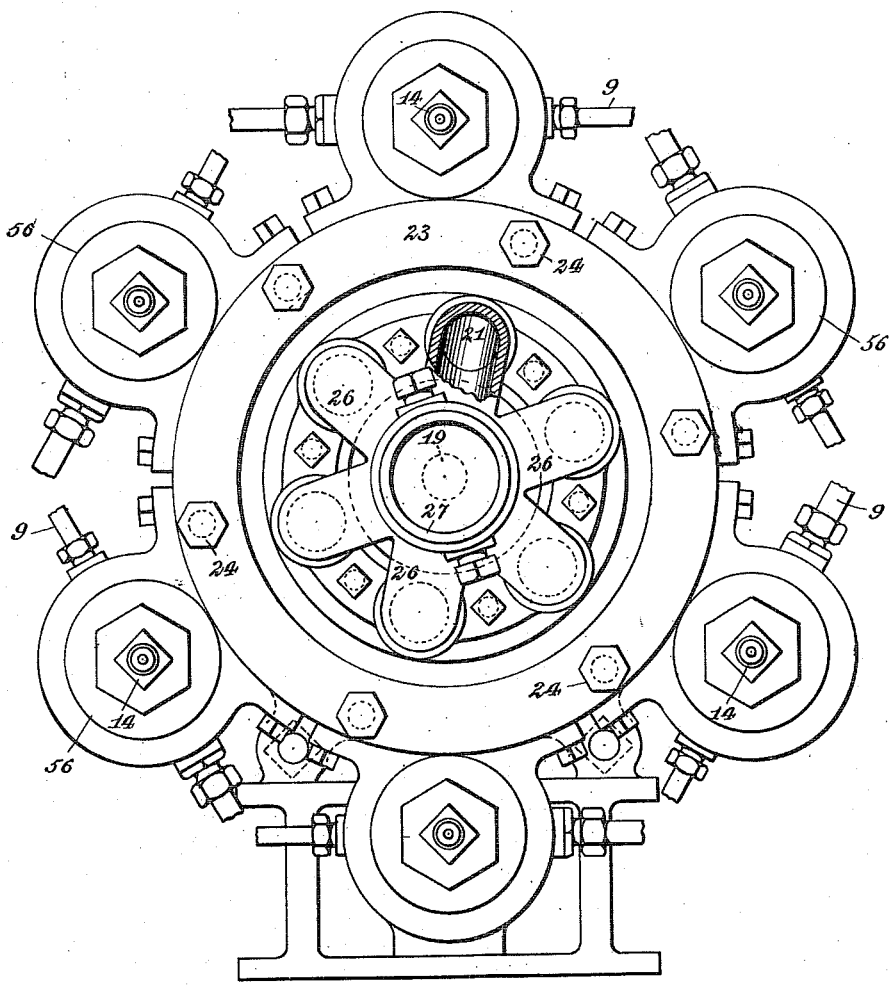

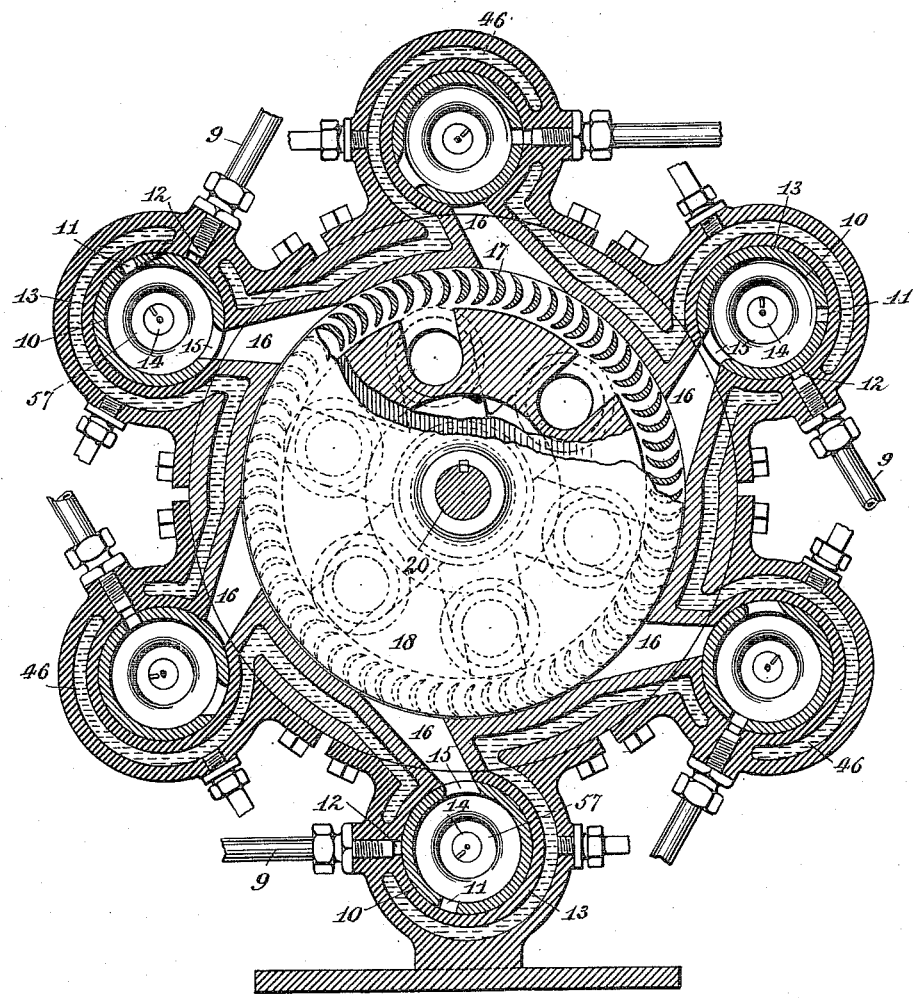

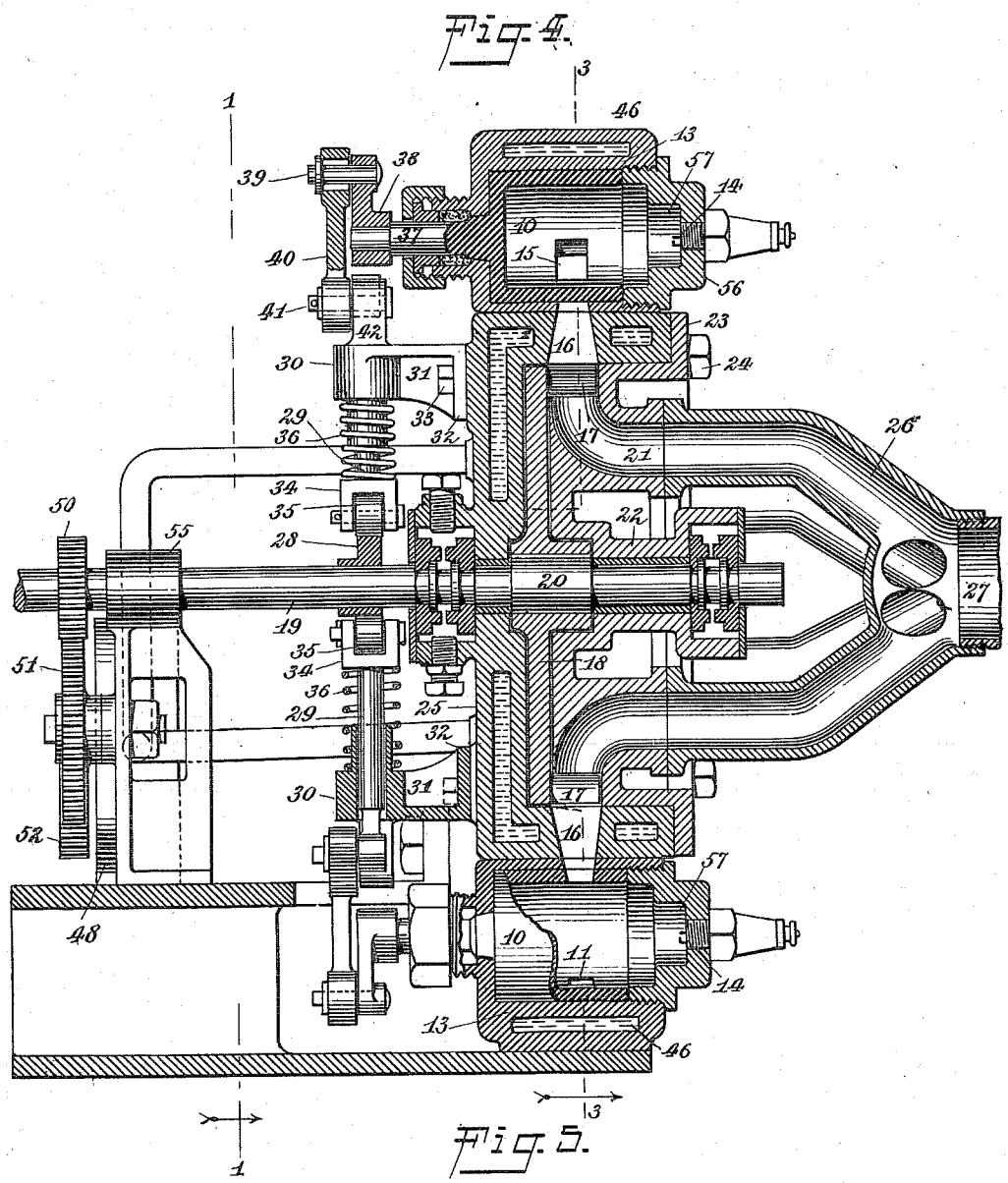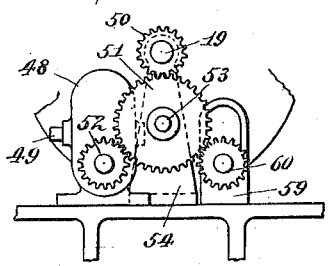

FRANCISCO LOBO, OF BROOKLYN, NEW YORK.

INTERNAL-COMBUSTION TURBINE-ENGINE.

1,296,980.     Specification of Letters Patent.     Patented Mar. 11, 1919.

Application filed November 14, 1918. Serial No. 262,502.

*To all whom it may concern:*

Be it known that I, FRANCISCO LOBO, a subject of the King of Spain, and a resident of the city of New York, borough of Brooklyn, in the county of Kings and State of New York, have invented a new and Improved Internal-Combustion Turbine-Engine, of which the following is a full, clear, and exact description.

Among the princial objects which the present invention has in view are: to coördinate the functioning members of the engine to avoid vibration of the engine; to insure the timing of the engine, and particularly the fuel supply thereof; to simplify and cheapen the construction; and to simplify the action of the moving parts of the engine.

Drawings.

Figure 1 is a side view of the engine, the rotor shaft and bed plate being shown in section, the section being taken as on the line 1—1 in Fig. 4;

Fig. 2 is a side view of the engine taken from the side thereof opposite that shown in Fig 1;

Fig. 3 is a vertical cross section of the engine, the section being taken as on the line 3—3 in Fig. 4;

Fig. 4 is a vertical longitudinal section of the engine, the section being taken as on the line 4—4 in Fig. 1.

Fig. 5 is a detail view showing the gears and transmission connecting the electrical generator and a water circulating pump with the driving shaft of the machine.

Description.

The herein disclosed engine employs an explosive fuel embodying a hydrocarbon gas mixed with the necessary atmospheric air. The fuel mixture or the atmospheric air thereof is compressed before being delivered to the engine, by means not shown herein and forming no part of the present engine. In the following description, therefore, it will be understood that a mixture of proper ingredients is delivered from a suitable source under high pressure by means of the feed pipes 9 whenever the rotary sleeve valve 10 is rocked to present the intake port 11 of the intake passage 12 with which each cylinder 13 is provided.

In the present drawings, the engine is shown as equipped with six cylinders 13, each of which is provided with a rocking sleeve 10, which operates as a valve to hold the explosive fuel delivered by the pipes 19, while the same is exploded by the electric spark of the plugs 14. The plugs 14 are suitably connected with an electric source and a sparking attachment therefore to produce a jump between the terminals of the said plugs in the moment while the sleeves 10 are being rocked from the position where the fuel is fed into the said sleeves, to the position where the exhaust ports 15 of each sleeve are alined with the delivery passage 16.

As seen best in Fig. 3 of the drawings, when the ports 15 are alined with the delivery passages 16, the expanding gases incidental to the explosion which directly preceded the disposition of the valve 10, are delivered through the said passages to impinge upon the buckets 17 of the rotor 18.

It will be noted that the buckets 17 are curved to return the outgoing streams of gas toward the direction from which they emanate in conformity with good practice in rotor impulse buckets. It will be seen in Fig. 4 of the drawings, that the buckets are integral with and laterally extended from the disk body of the rotor 18. The rotor 18 is keyed to the rotor shaft 19 and upon the enlarged portion 20 thereof.

The gases coming from the channels formed by the buckets 17, pass to curved exhaust passages 21 formed in a central housing forming the bearing 22 and having a bolting flange 23 through which the bolts 24 are driven into the casing 25 of the engine.

By reference to Fig. 3 of the drawings, it will be seen that the inclination of the various passages 16 is such that the gases when liberated from the explosion chambers are compelled to move in a direction substantially tangential to the periphery of the rotor 18 or in correspondence with the rotary path of the buckets 17. Each passage 16 is correlated to one of the passages 21. Each of said passages 21 is advanced or spaced apart from its correlated passage 16. This provides that at all times during the expansion of the gas from any one of the explosion chambers, buckets 17 are impinged upon by the gas to move the same until the gas passes from between the buckets to the correlated passage 21.

As will be seen by reference to Fig. 1 of the drawings, the mechanism for rocking the valves 10, is such that said valves are rocked in groups. In the present engine, there are two groups, each group comprising three cylinders and three valves 10, one mounted in each of said cylinders. A cam plate having cam risers 28, is rigidly mounted on the shaft 19. The risers 28 function to lift or extend outward radially the plungers 29. The plungers 29 are reciprocatively mounted in bearings 30 of the brackets 31, which, as seen best in Fig. 1 of the drawings, have bolting flanges 32, through which bolts 33 are driven into the casing 25, for holding the said brackets permanently in position.

To avoid friction, the plungers 29 have each a yoke 34, wherein is mounted a wheel 35, said wheels tracking on the periphery of the cam and risers 28 thereof. The plungers 29 are normally retracted toward the shaft 19, by means of spiral springs 36.

As seen best in Fig. 4 of the drawings, each of the sleeve valves 10 is rotatably mounted in one of the cylinders 13, and is provided with a stud shaft 37 extending from the solid end of the said cylinder. Rigidly mounted on each shaft 37, is a crank arm 38, in the extremity whereof is placed a crank pin 39. The arms 38 and pins 39 thereof are operatively connected with the plungers 29, by bell cranks 40. The bell cranks 40 are each mounted by pivot pins 41, in bearings formed in standards 42 extending from the flanges 32 of the brackets 31. To receive the pins 39 in the crank arms 38 and the pins 43 in the ends of the plungers 19, are elongated slots 44 and 45, respectively. These slots permit the pins 39 and 43 to shift lengthwise of the arms of the bell cranks 40 to which they belong, during the rocking action of the said bell cranks and of the arms 38.

As seen best in Figs. 3 and 4 of the drawings, the cylinders 13 and the casing 25 are constructed to provide water jacket spaces 46 and 47. Water is supplied for maintaining the circulation through said jackets, by a pump 48, the delivery pipe 49 whereof is connected as shown, with the cylinder 13 and with the space 46 therein. The pump 48 is driven primarily from the shaft 19, with which it is operatively connected, by a train of gears, embodying a pinion 50, transmission gear wheel 51, and the driven gear wheel 52. As seen best in Figs. 4 and 5 of the drawings, the wheel 51 is mounted on a stud shaft 53 set out from the standard 54, which furnishes the bearing 55 for said shaft 19.

One end of each of the cylinders 13 is closed by a removable head 56. In each of the heads 56, an ignition chamber 57 is formed. The electrodes of the various spark plugs 58 extend into the said chamber to serve as ignition elements for the charges introduced into the cylinders when the ports 11 are alined with the intake passages 12.

The electrical system which furnishes the current and breaks the same to provide the jump spark in the plugs 58, is not shown in the drawings, as any approved mechanism or apparatus for accomplishing this purpose may be employed. As indicated in Fig. 5, however, a magneto 59 may be connected to be driven from the shaft 19, a driven gear wheel 60 of proper ratio to the transmission wheel 51 and the pinion 50 being provided to that end. Whatever timing mechanism is employed, it will be understood that it will operate to form the various sparks to ignite the charge in the three cylinders of each group, as above mentioned, when the ports 11 and 15 are closed by the solid walls of the cylinders 13, and preferably on the eve of the opening of the ports 15 to the passages 16. In this manner, the maximum expansion of the gases is utilized for impingement upon the buckets 17 to revolve the rotor 18 and the shaft 19 connected therewith.

*Claims.*

1. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related with one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said delivery passages, and an intake port communicating with an explosive fuel supply; means for closing said ports alternately and simultaneously; and means for igniting the charge in each of said chambers during the period when said ports are both closed.

2. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related with one of said delivery passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said delivery passages and an intake port communicating with an explosive fuel supply; means for closing said ports alternately and simultaneously; means for igniting the charge in each of said chambers during the period when said ports are both closed; and means for cooling said casing and said cylinders, said means embodying a water circulatory system, and communicating water spaces provided in the walls of said casing and said cylinders.

3. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related with one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said delivery passage and an intake port communicating with an explosive fuel supply; means for closing said ports alternately and simultaneously; means for igniting the charge in each of said chambers during the period when said ports are both closed, said means embodying a plurality of cylindrical sleeve valves, said valves lining said sleeves, said valves having intake and exhaust ports formed therein for alinement with the intake and exhaust ports of said cylinders in timed relation to the action of the engine; and means operatively connected with said rotary shaft for rocking said valves.

4. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related with one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said inlet passages and an intake port communicating with an explosive fuel supply; means for closing said ports alternately and simultaneously; means for igniting the charge in each of said chambers during the period when said ports are both closed, said means embodying a plurality of cylindrical sleeve valves, said valves lining said cylinders and having intake and exhaust ports formed therein for alinement with the intake and exhaust ports of said cylinders in timed relation to the action of the engine; and means operatively connected with said rotary shaft for rocking said valves in grouped relation.

5. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related to one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said inlet passages and an intake port communicating with an explosive fuel supply; means for closing said ports alternately and simultaneously; means for igniting the charge in each of said chambers during the period when said ports are both closed, said means embodying a plurality of cylindrical sleeve valves, said valves lining said cylinders and having intake and exhaust ports formed therein for alinement with the intake and exhaust ports of said cylinders in timed relation to the action of the engine; and means operatively connected with said rotary shaft for rocking said valves, said valves being connected with said means for forming alternately operating groups.

6. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related to one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said inlet passages and an intake port communicating with an explosive fuel supply; means for closing said ports alternately and simultaneously; means for igniting the charge in each of said chambers during the period when said ports are both closed, said means embodying a plurality of cylindrical sleeve valves, said valves lining said cylinders and having intake and exhaust ports formed therein for alinement with the intake and exhaust ports of said cylinders in timed relation to the action of the engine; and means operatively connected with said rotary shaft for rocking said valves, said valves being connected with said means for forming alternately operating groups, said groups being relatively disposed, the members of one group exhausting the composite gases while the members of the other group are receiving the explosive charges.

7. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related with one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said delivery passages and an intake port communicating with an explosive fuel supply; means for closing said ports alternately and simultaneously; means for igniting the charge in each of said chambers during the period when said ports are both closed, said means embodying a plurality of cylindrical sleeve valves, said valves lining said cylinders and having intake and exhaust ports formed therein for alinement with the intake and exhaust ports of said cylinders in timed relation to the action of the engine; means operatively connected with said rotary shaft for rocking said valves, said means embodying a plurality of stud shafts, each mounted on one of said valves for extension through the walls of said cylinders; and means for operatively connecting each of said stud shafts with said rotary shaft, said means embodying reciprocating devices connected with said stud shafts for rocking the same.

8. An engine as characterized comprising a rotary shaft; a rotor fixedly mounted thereon, said rotor having a plurality of curved laterally extended bucket members, said bucket members being arranged to form a series of curved passages; a casing for said rotor, said casing inclosing said rotor and having a plurality of inlet passages, said inlet passages being substantially tangential to said rotor, the inclination of all of said passages being in a direction corresponding with the rotation of said rotor; a cover for said casing for inclosing said rotor, said cover forming in conjunction with said casing, a channel for said bucket members, said cover having a series of exhaust passages, each coöperatively related with one of said inlet passages, said exhaust passages being advanced in the direction of rotation of said rotor with relation to the inlet passages with which it is related; a plurality of cylinders having explosion chambers rigidly mounted on said casing, each of said chambers having an exhaust port communicating with one of said inlet passages and an intake port communicating with an explosive fuel supply; means for closing said ports alternately and simultaneously; means for igniting the charge in each of said chambers during the period when said ports are both closed, said means embodying a plurality of cylindrical sleeve valves, said valves lining said cylinders and having intake and exhaust ports formed therein for alinement with the intake and exhaust ports of said cylinders in timed relation to the action of the engine; means operatively connected with said rotary shaft for rocking said valves, said means embodying a plurality of stud shafts, each mounted on one of said valves for extension through the walls of said cylinders; and means for operatively connecting each of said stud shafts with said rotary shaft, said means embodying a plurality of reciprocating plungers mounted on said casing, a plurality of cams mounted on said shaft in operative relation to said plungers for moving the same outward from the center of said shaft, and a plurality of bell cranks operatively connecting said plungers and said stud shafts.

FRANCISCO LOBO.